United States Patent [19]

Davis et al.

[11] Patent Number: 5,760,489

[45] Date of Patent: Jun. 2, 1998

[54] METHOD FOR TRANSMITTING SIGNALS BETWEEN A MICROPROCESSOR AND AN INTERFACE CIRCUIT

[75] Inventors: Benjamin R. Davis, Chandler; John M. Pigott, Phoenix, both of Ariz.; Kevin S. Anderson, Noblesville, Ind.; Charles R. Powers, Austin, Tex.

[73] Assignee: Motorola, Inc., Schaumburg, Ill.

[21] Appl. No.: 726,023

[22] Filed: Oct. 4, 1996

[51] Int. Cl.$^6$ ............................................. B60R 21/00
[52] U.S. Cl. .................. 307/10.1; 180/282; 280/735; 340/310.01; 701/45
[58] Field of Search .................. 364/424.055–424.057; 375/286–293; 307/9.1, 10.1; 280/734, 735; 180/271, 282; 340/436, 438, 699, 310.01, 310.06; 701/45–47

[56] References Cited

U.S. PATENT DOCUMENTS

| | | | |
|---|---|---|---|
| 4,571,735 | 2/1986 | Furse | 375/293 |
| 5,142,278 | 8/1992 | Moallemi et al. | 307/10.1 |
| 5,225,986 | 7/1993 | Mickeler et al. | 364/424.055 |
| 5,473,635 | 12/1995 | Chevroulet | 375/287 |

OTHER PUBLICATIONS

Chrysler Corporation—Vehicle Engineering Office, Engineering Standard, Performance Standard, "Integrated Circuit—CSC Bus Driver/Receiver Master Interface", No: PPF–391E–266, Apr. 12, 1996, whole document.

*Primary Examiner*—Richard T. Elms
*Attorney, Agent, or Firm*—Gary Hoshizaki; Ziye Zhou

[57] ABSTRACT

A control module (11) in an airbag system (10) supplies electrical energy to and communicates with remote modules (20A–20N) through a two-wire connection. The supplied electrical energy is partially used to operate the remote modules (20A–20N) and partially stored within the remote modules (20A–20N) for deploying squibs (22A–22N). The control module (11) sends command signals to the remote modules 20A–20N) via voltage excursions between a high and an intermediate voltage levels. The remote modules (20A–20N) send signals to the control module (11) via current excursions. When an accident situation is detected, the voltage across the two-wire connection is lowered to a low voltage level, thereby interrupting a normal operation of the airbag system (10). The control module (11) then sends out firing signals via voltage excursion between the intermediate and low voltage levels. The remote modules (20A–20N) decode the firing signals and deploy the squibs (22A–22N) to inflate airbags.

20 Claims, 2 Drawing Sheets

METHOD FOR TRANSMITTING SIGNALS BETWEEN A MICROPROCESSOR AND AN INTERFACE CIRCUIT

BACKGROUND OF THE INVENTION

The present invention relates, in general, to signal transmission and, more particularly, to signal transmission between a microprocessor and an interface circuit.

Airbags in conjunction with seat belts have proven to be a primary safety mechanism in preventing severe automobile accident injuries. Airbags are usually placed in the steering wheel or dash board of an automobile to cushion head impact. Airbags are also placed in doors for occupant protection in side impacts and under the dash for preventing leg injuries.

An airbag system includes sensors which detect when an accident situation is going to occur via proximity sensing or impact sensing. Once the accident situation is detected, the airbag system rapidly inflates an airbag, thereby providing a cushion to soften the impact. A typical automobile airbag system includes a microprocessor, a reservoir capacitor, and controlling switches located in a control module. The airbag system also includes squibs located in airbag assemblies and remotely located from the control module. During an accident situation, the control module provides energy for deploying the squibs, which in turn ignites pyrotechnic material to inflate airbags.

A problem associated with centrally locating the control module away from the squibs is that long wire runs are required between the control module and the squibs. The wire runs are often one to two meters in length. Long wire runs are receptive to electromagnetic radiation inducing a current into the wire runs. To eliminate the prospect of electromagnetic pickup in the wire runs deploying an airbag inadvertently, a high current is usually required to produce sufficient heat in a squib to ignite the pyrotechnic material. Typically, the high current is in excess of one ampere. Accordingly, the wire runs and controlling switches must be designed to handle the high current, thereby increasing the weight, size, and cost of the airbag system. Moreover, the long wire runs may be severed during an accident, thereby disconnecting the squibs from the reservoir capacitor.

In an accident situation, it cannot be assumed that the battery remains active. The reservoir capacitor must store sufficient energy so as to supply a current sufficient to heat each squib in the airbag system. Applying a high voltage to a large capacitance capacitor increases the energy stored in the capacitor. A large capacitance capacitor and circuitry, such as voltage boosting circuitry, for applying a high voltage across the capacitor are costly components in an airbag system. Further, the large capacitance limits the type of capacitor that can be cost effectively used to an aluminum electrolytic capacitor. The aluminum electrolytic capacitor has a reliability problem because electrolytic capacitors dry out with age which can reduce the capacitance of the capacitor or in a worst case short out, thereby rendering the airbag system useless. To ensure all squibs are deployed properly, current limit circuitry is added in the conductive path of each squib to prevent any one squib from using more current than required. The current limit circuitry adds energy inefficiency, cost, and complexity to the airbag system.

Accordingly, it would be advantageous to have a method for operating an airbag system. It is desirable for the method to be reliable. It would be of further advantage for the airbag system to be simple and cost efficient.

DETAILED DESCRIPTION OF THE DRAWINGS

Figure 1:
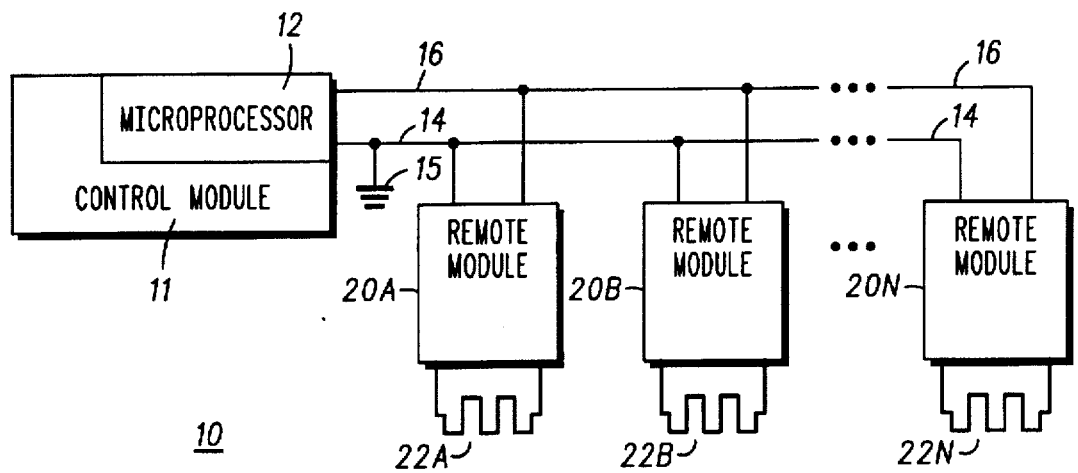
FIG. 1 is a block diagram of an airbag system in accordance with the present invention.

Generally, the present invention provides a method for transmitting signals between a microprocessor and an interface circuit. More particularly, the present invention provides a simple, reliable, and efficient method for transmitting signals between a microprocessor located in a control module of an automobile airbag system and an interface circuit located in a remote module of the airbag system.

In accordance with a preferred embodiment of the present invention, the control module is coupled to a set of remote modules via a two wire connection which includes a reference bus and a signal transmission bus. During a normal operating mode of the airbag system, the voltage across the signal transmission bus and the reference bus is within a first voltage range. The control module sends a first type of signals, i.e., command signals, to the remote modules in a set of voltage excursions within the first voltage range. The remote modules decode the command signal voltage excursions and execute the commands accordingly. The remote modules send data signals to the control module by drawing encoded current pulses from the control module through the two wire connection. Therefore, the communication between the control module and the remote modules is a bi-directional communication. Furthermore, the control module supplies electrical energy to the remote modules via the two wire connection. A portion of the electrical energy is used to operate the remote modules, and another portion of the electrical energy is stored in reservoir capacitors in the remote modules.

When an accident situation is detected, the voltage across the two wire connection changes to a reset voltage level which is outside the first voltage range. The reset voltage level places the remote modules in a mode ready for receiving firing signals from the control module. If there is a command signal being transmitted when the accident situation is detected, it is interrupted by the transition of the voltage across the two wire connection to the reset voltage level. The control module sends out a second type of signals, i.e., firing signals, in a set of voltage excursions within a second voltage range. The second voltage range is between the reset voltage level and a firing signal voltage level which may be either outside or inside the first voltage range. In other words, the second voltage range may be disjoint from, abut with, or overlap the first voltage range. The firing signals contain the instructions of which airbags in the airbag system will be inflated to protect the occupants in the automobile. The remote modules decode the firing signals and inflate airbags according to the firing signals. To inflate a particular airbag, a squib in the airbag is connected to a reservoir capacitor in the corresponding remote module. The electrical energy stored in the reservoir capacitor is transferred to the squib. Heat is generated in the squib, and the generated heat ignites a pyrotechnic material. The ignited pyrotechnic material releases a gas, which is collected by the airbag. Thus, the airbag is inflated.

FIG. 1 is a block diagram of an airbag system 10 in accordance with the present invention. Airbag system 10 includes a control module 11. Control module 11 includes a microprocessor 12 and sensor circuitry (not shown) for determining when an accident occurs. Control module 11 is connected to a number of remote modules such as remote modules 20A, 20B, . . . , and 20N via a reference bus 14. Reference bus 14 is connected to a conductor 15 for receiving a reference voltage level such as, for example, ground voltage level. Control module 11 is also connected to remote modules 20A, 20B, . . . , and 20N via a data bus or a signal transmission bus 16. Remote modules 20A, 20B, . . . , and 20N are connected to squibs 22A, 22B, . . . , and 22N, respectively. Each remote module includes circuitry (not shown) for powering a corresponding squib to ignite pyrotechnic material in an airbag (not shown).

Control module 11 is typically placed in the dash area of an automobile. Remote modules 20A-20N are remotely located from control module 11 in airbag assemblies located in areas such as steering wheel, dash board, door panels, etc. Through reference bus 14 and signal transmission bus 16, control module 11 transmits signals to remote modules 20A-20N by varying the voltage of signal transmission bus 16 with respect to reference bus 14. Furthermore, control module 11 transmits electrical energy to remote modules 20A-20N. A portion of the electrical energy transmitted to a remote module, such as remote module 20A, is used to operate remote module 20A, and another portion of the electrical energy is stored in remote module 20A. When an airbag (not shown) associated with remote module 20A is to be inflated during an accident situation, control module 11 transmits a firing signal to remote module 20A and the stored electrical energy in remote module 20A is transmitted to squib 22A, thereby generating heat in squib 22A to ignite a pyrotechnic material in an airbag in the airbag assembly which includes squib 22A.

In accordance with one embodiment of the present invention, the voltage of signal transmission bus 16 relative to reference bus 14 is at one of three voltage levels. When control module 11 is idle, the voltage at signal transmission bus is at a high voltage level such as, for example, 17 volts (V). At the high voltage level, control module 11 supplies the electrical energy to remote modules 20A-20N. Control module 11 sends command signals to remote modules 20A-20N via a set of voltage excursions between the high voltage level and a intermediate voltage level such as, for example, 5 V. Remote modules 20A-20N decode the command signals and execute the commands accordingly. Remote modules 20A-20N send data signals to control module 11 by generating distinctive current excursions in signal transmission bus 16. Control module 11 includes circuitry (not shown) to decode the current excursions and read the data signals. When an accident situation is detected, the voltage at signal transmission bus 16 relative to reference bus 14 changes to a low voltage level such as, for example, 0 V. The transmission of command signals is interrupted and remote modules 20A-20N are set in the mode ready for receiving firing signals. Control module 11 sends firing signals to remote modules 20A-20N via a set of voltage excursions between the low voltage level and the intermediate voltage level. The firing signals are encoded with information about which airbags will be inflated and in what order the airbags will be inflated. Remote modules 20A-20N receive and decode the firing signals and use the electrical energy stored in remote modules 20A-20N to inflate the airbags according to the firing signals.

In accordance with an alternative embodiment of the present invention, the firing signals are encoded in a set of voltage excursions between the low voltage level and a fourth voltage level which may be either higher or lower than the intermediate voltage level. Therefore, the voltage of signal transmission bus 16 relative to reference bus 14 is at one of four voltage levels.

Figure 2:
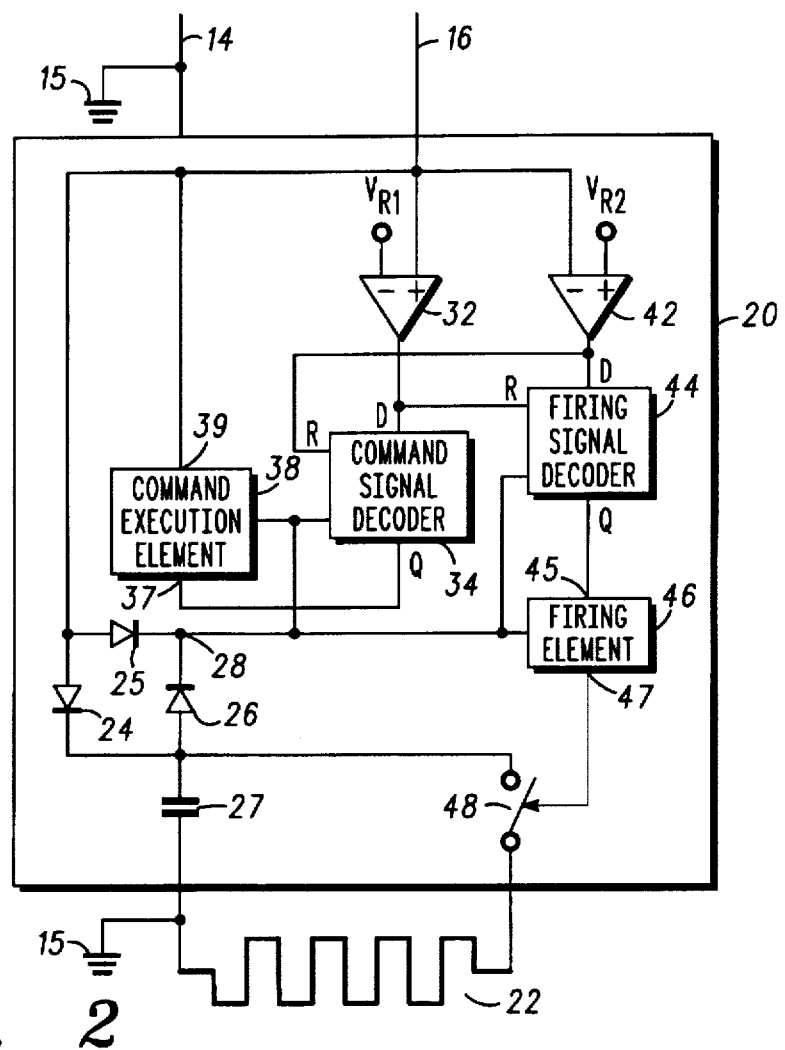
FIG. 2 is a block diagram of a remote module in the airbag system of FIG. 1.

FIG. 2 is a block diagram of a remote module 20 connected to a squib 22. Remote module 20 may serve as a remote module, such as remote module 20A, 20B, . . . , or 20N, in airbag system 10 of FIG. 1. Likewise, squib 22 may serve as a squib, such as squib 22A, 22B, . . . , or 22N, in airbag system 10 of FIG. 1. It should be noted that the same reference numbers are used in the figures to represent the same elements.

Remote module 20 includes diodes 24, 25, 26, and a reservoir capacitor 27. An anode of diode 24 and an anode of diode 25 are connected to signal transmission bus 16. A cathode of diode 24 is connected to an anode of diode 26 and to a first electrode of reservoir capacitor 27. A cathode of diode 25 and a cathode of diode 26 are connected together to form a node 28, through which the operating voltage for the circuitry in remote module 20 is provided. A second electrode of reservoir capacitor 27 is connected to conductor 15 and to a low side electrode of squib 22. Collectively, diodes 24, 25, 26, and reservoir capacitor 27 form an energy supply and storage element of remote module 20.

Remote module 20 further includes an interface circuit which comprises comparators 32 and 42, a command signal decoder 34, a command execution element 38, a firing signal decoder 44, a firing element 46, and a switch 48. The interface circuit in remote module 20 operates on the voltage provided at node 28 by control module 11 of FIG. 1 via signal transmission bus 16, and diodes 24, 25, and 26. Therefore, comparators 32 and 42, command signal decoder 34, command execution element 38, firing signal decoder 44, and firing element 46 are connected to node 28 for receiving the operating voltage.

Comparator 32 has a noninverting input connected to signal transmission bus 16 and an inverting input connected for receiving a reference voltage $V_{R1}$ of, for example, 10.0 V. The reference voltage $V_{R1}$ is generated by a voltage source circuit (not shown) in remote module 20. An output of comparator 32 is connected to a data input (D) of command signal decoder 34 and to a reset input (R) of firing signal decoder 44. An output (Q) of command signal decoder 34 is connected to an input 37 of command execution element 38. A signal output 39 of command execution element 38 is connected to signal transmission bus 16. Collectively, comparator 32, command signal decoder 34, and command execution element 38 form a command signal processing element of the interface circuit in remote module 20.

Comparator 42 has an inverting input connected to signal transmission bus 16 and a noninverting input connected for receiving a reference voltage $V_{R2}$ of, for example, 2.5 V. The reference voltage $V_{R2}$ is generated by a voltage source circuit (not shown) in remote module 20. An output of comparator 42 is connected to a data input (D) of firing signal decoder 44 and to a reset input (R) of command signal decoder 34. An output (Q) of firing signal decoder 44 is connected to an input 45 of firing element 46. An output 47 of firing element 46 is connected a control electrode of switch 48. A first current conducting electrode of switch 48 is connected to the first electrode of reservoir capacitor 27, and a second current conducting electrode of switch 48 is connected to a high side electrode of squib 22. Comparator 42, firing signal decoder 44, firing element 46, and switch 48 collectively form a firing signal processing element of the interface circuit in remote module 20.

Because reservoir capacitor 27 is located in remote module 20, the wire runs between reservoir capacitor 27 and squib 22 is in the range of centimeters. Compared with the prior art airbag systems which have wire runs of one to two meters in length, the short wire run of the present invention greatly reduces the chance of inadvertent deploying an airbag caused by electromagnetic radiation inducing a current in the wire run. Therefore, a relatively low current can be used to deploy squib 22. By using a low current system, the cost, weight, complexity of airbag system 10 is reduced compared with the prior art airbag systems. Because reservoir capacitor 27 is used to deploy only one squib, the capacitance of and the voltage applied across reservoir capacitor 27 to store electrical energy is significantly reduced compared with the prior art airbag systems. Furthermore, the current limit circuitry in the prior art airbag systems is eliminated from airbag system 10 of the present invention to improve its energy efficiency, cost efficiency, and reliability.

Figure 3:
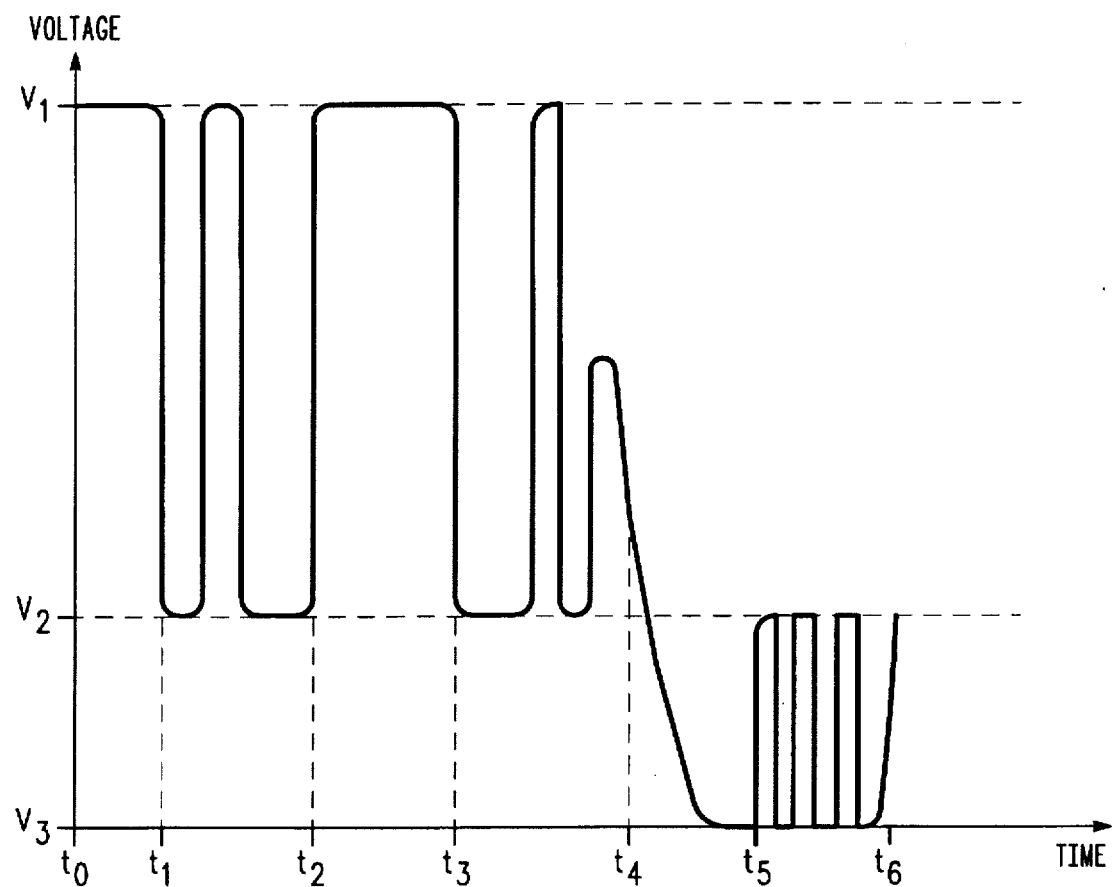
FIG. 3 is a timing diagram for the transmission of signals between the control module and the remote modules in the airbag system of FIG. 1 in accordance with the present invention.

FIG. 3 is a timing diagram 60 for transmitting signals between control module 11 and remote modules 20A–20N in airbag system 10 of FIG. 1 in accordance with the present invention. It should be noted that each of remote modules 20A–20N in airbag system 10 of FIG. 1 has a structure similar to remote module 20 shown in FIG. 2. Timing diagram 60 illustrates the voltage at signal transmission bus 16 relative to reference bus 14 as a function of time.

Between time $t_0$ and time $t_1$, control module 11 is idle. The voltage across signal transmission bus 16 and reference bus 14 is at a first voltage level $V_1$ of, for example, 17.0 V. The voltage level $V_1$ is transmitted to each of remote modules 20A–20N in airbag system 10 of FIG. 1.

Referring to FIG. 2, the voltage level $V_1$ is higher than the reference voltage $V_{R1}$ at the inverting input of comparator 32. Thus, the output of comparator 32 is at a logic high voltage level. The logic high voltage level is transmitted to the reset input (R) of firing signal decoder 44. Therefore, firing signal decoder 44 is in a reset mode. Likewise, the voltage level $V_1$ is higher than the reference voltage $V_{R2}$ at the noninverting input of comparator 42. Thus, the output of comparator 42 is at a logic low voltage level. The logic low voltage level is transmitted to the reset input (R) of command signal decoder 34. Therefore, command signal decoder 34 is in a normal mode and ready for receiving signals at its data input (D). Signal transmission bus 16 also transmits an electrical energy to remote module 20. A portion of the electrical energy is used to provide the operating voltage of remote module 20 at node 28, another portion of electrical energy is stored in reservoir capacitor 27.

Between time $t_1$ and time $t_2$ in timing diagram 60 of FIG. 3, in response to control module 11 sending out a command signal, a set of voltage excursions is transmitted along signal transmission bus 16 to each of remote modules 20A–20N in airbag system 10. The voltage excursions are between the first voltage level $V_1$ and a second voltage level $V_2$ of, for example, 5.0 V. In a preferred embodiment, the command signals are transmitted at a low rate such as, for example, approximately 20 kilobits per second (kbps) to minimize the interference between the command signal with other electronic equipment in the automobile. The voltage excursions are preferably wave-shaped to further minimize the interference. Typically, the command signal includes address codes, command codes, etc.

Referring now to FIG. 2, the voltage level $V_2$ is higher than the reference voltage level $V_{R2}$ at the noninverting input of comparator 42. Thus, the output of comparator 42 remains at a logic low voltage level and command signal decoder 34 remains in the normal mode. Because the voltage level $V_2$ is lower than the reference voltage level $V_{R1}$, the command signal encoded in the voltage excursions at the noninverting input of comparator 32 is transmitted to the data input (D) of command signal decoder 34. Command signal decoder 34 decodes the command signal and transmits the decoded command signal to command execution element 38, which executes the commands. By way of example, the commands include monitoring the states of remote module 20, monitoring the condition of reservoir capacitor 27, etc. In response to transmitting a data signal to control module 11, command execution element 38 generates a current excursion in signal output 39, which draws a current from control module 11 via signal transmission bus 16. The current excursion is encoded with the data signal and preferably distinguishable from normal supply current from control module 11 to remote module 20. Control module 11 decodes the current excursion to read the data signal.

Between time $t_2$ and time $t_3$, the voltage across signal transmission bus 16 and reference bus 14 is at the first voltage level $V_1$. Airbag system 10 of FIG. 1 is in the same state as it is in during the time period between time $t_0$ and time $t_1$. Therefore, control module 11 is idle, command signal decoder 34 is in the normal mode, and firing signal decoder 44 is in the reset mode.

At time $t_3$, another set of command signals is transmitted to remote modules 20A–20N in airbag system 10. At time $t_4$, an accident situation is detected. The command signal is interrupted and the voltage at signal transmission bus 16 relative to reference bus 14 change to a third voltage level $V_3$ of, for example, zero.

Referring to FIG. 2, the voltage level $V_3$ is lower than the reference voltage $V_{R1}$ at the inverting input of comparator 32. Thus, the output of comparator 32 is at a logic low voltage level. The logic low voltage level is transmitted to the reset input (R) of firing signal decoder 44. Therefore, firing signal decoder 44 is in a normal mode and ready for receiving firing signals at its data input (D). Likewise, the voltage level $V_3$ is lower than the reference voltage $V_{R2}$ at the noninverting input of comparator 42. Thus, the output of comparator 42 is at a logic high voltage level. The logic high voltage level is transmitted to the reset input (R) of command signal decoder 34. Therefore, command signal decoder 34 is in a reset mode.

Between time $t_5$ and time $t_6$ in timing diagram 60 of FIG. 3, a firing signal encoded in a set of voltage excursions is transmitted along signal transmission bus 16 to each of remote modules 20A–20N in airbag system 10. In accordance with one embodiment of the present invention, the voltage excursions are between the third voltage level $V_3$ and the second voltage level $V_2$. In order to deploy airbags quickly and prevent injury, the firing signal is preferably transmitted at a high rate such as, for example, approximately 200 kbps. Typically, the firing signal includes address codes, firing codes, etc.

Referring now to FIG. 2, the voltage level $V_2$ is lower than the reference voltage level $V_{R1}$ at the inverting input of comparator 32. Thus, the output of comparator 32 remains at a logic low voltage level and firing signal decoder 44 remains in the normal mode. Because the voltage level $V_2$ is higher than the reference voltage level $V_{R2}$, the firing signal encoded in the voltage excursions at the inverting input of comparator 42 is transmitted to the data input (D) of firing signal decoder 44. Firing signal decoder 44 decodes the firing signal and transmits the decoded firing signal to firing element 46, which executes the firing command. If a particular airbag is inflated to protect the occupants in the automobile, switch 48 in the corresponding remote module is switched on by firing element 46. Electrical energy stored in reservoir capacitor 27 is released to deploy squib 22, thereby igniting the pyrotechnic material and inflating the airbag.

Alternatively, the firing signal is encoded in a set of voltage excursions between the third voltage level $V_3$ and a fourth voltage level, which may be either higher or lower than the second voltage level $V_2$. In accordance with the present invention, the fourth voltage level is preferably lower than the reference voltage level $V_{R1}$ at the inverting input of comparator 32. Thus, the output of comparator 32 remains at a logic low voltage level and firing signal decoder 44 remains in the normal mode. Further, the fourth voltage level is preferably higher than the reference voltage level $V_{R2}$ at the noninverting input of comparator 42, thereby allowing the firing signal encoded in the voltage excursions at the inverting input of comparator 42 to be transmitted to the data input (D) of firing signal decoder 44.

It should be noted that, when an accident situation is detected, the voltage across signal transmission bus 16 and reference bus 14 changes to the third voltage level $V_3$ regardless of the previous states of control module 11 and remote modules 20A–20N in airbag system 10. Command signal decoder 34 changes to the reset mode, and firing signal decoder 44 changes to the normal mode ready for receiving the firing signals from control module 11. When the voltage across signal transmission bus 16 and reference bus 14 is at the voltage level $V_3$, a portion of the electrical energy stored in reservoir capacitor 27 is released to operate remote module 20. It should also be noted that, depending on the type of the accident and the position of the occupants in the automobile, control module 11 may send firing signals to inflate a single airbag, several airbags in a sequence, or several airbags simultaneously, thereby effectively protecting the occupants in the automobile and minimizing the repair cost after the accident.

By now it should be appreciated that a method for transmitting signals between a microprocessor and an interface circuit has been provided. The signal transmission method of the present invention employs a simple two wire connection between the microprocessor and the interface circuit. Using the signal transmission method of the present invention to operate an airbag system significantly improves the simplicity, reliability, energy efficiency, cost efficiency of the airbag system compared with prior art airbag systems.

While specific embodiments of the invention have been shown and described, further modifications and improvements will occur to those skilled in the art. It is understood that this invention is not limited to the particular forms shown and it is intended for the appended claims to cover all modifications of the invention which fall within the true spirit and scope of the invention.

We claim:

1. The method for transmitting signals between a microprocessor and an interface circuit, comprising the steps of:

coupling the interface circuit to the microprocessor via a transmission bus;

transmitting a first set of voltage excursions within a first voltage range via the transmission bus in response to transmitting a signal of a first type from the microprocessor to the interface circuit; and transmitting a second set of voltage excursions within a second voltage range via the transmission bus in response to transmitting a signal of a second type from the microprocessor to the interface circuit, the second voltage range including a voltage level which is outside the first voltage range.

2. The method of claim 1, wherein the second voltage range is disjoint from the first voltage range.

3. The method of claim 1, further comprising the step of transmitting a constant voltage within the first voltage range via the transmission bus in response to the microprocessor being idle.

4. The method of claim 1, further comprising the steps of:

decoding the first set of voltage excursions as the signal of the first type; and decoding the second set of voltage excursions as the signal of the second type.

5. The method of claim 1, further comprising the steps of:

transmitting a current excursion from the interface circuit to the microprocessor via the transmission bus; and decoding the current excursion as a signal transmitted from the interface circuit to the microprocessor.

6. The method of claim 1, further comprising the step of transmitting an electrical energy from the microprocessor to the interface circuit via the transmission bus.

7. The method of claim 6, further comprising the steps of:

operating the interface circuit using a first portion of the electrical energy; and storing a second portion of the electrical energy in the interface circuit.

8. The method of claim 7, further comprising the step of operating the interface circuit using the second portion of the electrical energy in response to the voltage at the transmission bus being outside the first voltage range.

9. A method for transmitting signals between a control module and a remote module in an airbag system, comprising the steps of:

coupling the remote module to the control module via a data bus and a reference bus;

transmitting a first set of voltage excursions across the data bus and the reference bus from the control module to the remote module in response to transmitting a command signal from the control module to the remote module, the first set of voltage excursions being between a first voltage level and a second voltage level, wherein the second voltage level is different from the first voltage level; and transmitting a second set of voltage excursions across the data bus and the reference bus from the control module to the remote module in response to transmitting a firing signal from the control module to the remote module, the second set of voltage excursions being between a third voltage level and a fourth voltage level, wherein the third voltage level is outside a range between the first voltage level and the second voltage level.

10. The method of claim 9, wherein the fourth voltage level is equal to the second voltage level.

11. The method of claim 9, further comprising the step of transmitting the first voltage level across the data bus and the reference bus from the control module to the remote module in response to the control module being idle.

12. The method of claim 9, further comprising the steps of:

placing the remote module in a mode for receiving the command signal in response to a voltage across the data bus and the reference bus being between the first voltage level and the second voltage level; and placing the remote module in a mode for receiving the firing signal in response to the voltage across the data bus and the reference bus being between the third voltage level and the fourth voltage level.

13. The method of claim 9, further comprising the steps of:

transmitting a current excursion from the remote module to the control module via the data bus; and decoding the current excursion as a signal transmitted from the remote module to the control module.

14. The method of claim 9, further comprising the steps of:

decoding the first set of voltage excursions as the command signal; and executing a command in response to the remote module receiving the command signal.

15. The method of claim 9, further comprising the steps of:

transmitting an electrical energy from the control module to the remote module;

using a first portion of the electrical energy to operate the remote module; and storing a second portion of the electrical energy in a reservoir capacitor in the remote module.

16. The method of claim 15, further comprising the steps of:

decoding the second set of voltage excursions as the firing signal;

generating heat in a squib by passing the second portion of the electrical energy stored in the reservoir capacitor to the squib in response to the remote module receiving the firing signal; and igniting a pyrotechnic material using the heat generated in the squib to inflate an airbag in the airbag system.

17. A method for operating an airbag system, comprising the steps of:

providing the airbag system which comprises a control module and an airbag assembly, wherein the airbag assembly includes a remote module coupled to the control module via a data bus and a reference bus, a squib responsive to the remote module for igniting a pyrotechnic material in the airbag assembly;

transmitting an electrical energy from the control module to the remote module;

storing a portion of the electrical energy in the remote module;

placing the remote module in a mode for receiving a command signal in response to a voltage across the data bus and the reference bus being between a first voltage level and a second voltage level, wherein the second voltage level is lower than the first voltage level;

transmitting the first voltage level across the data bus and the reference bus from the control module to the remote module in response to the control module being idle;

transmitting a first set of voltage excursions across the data bus and the reference bus from the control module to the remote module in response to transmitting the command signal from the control module to the remote module, the first set of voltage excursions being between the first voltage level and the second voltage level;

placing the remote module in a mode for receiving a firing signal in response to the voltage across the data bus and the reference bus being at a third voltage level, wherein the third voltage level is lower than the second voltage level;

transmitting a second set of voltage excursions across the data bus and the reference bus from the control module to the remote module in response to transmitting the firing signal from the control module to the remote module, the second set of voltage excursions being between the third voltage level and a fourth voltage level, wherein the fourth voltage level is higher than the third voltage level; and transmitting a current excursion from the remote module to the control module in response to transmitting a data signal from the remote module to the control module.

18. The method of claim 17, wherein the fourth voltage level is equal to the second voltage level.

19. The method of claim 17, further comprising the step of executing a command in response to the remote module receiving the command signal.

20. The method of claim 17, further comprising the steps of:

generating heat in the squib in the airbag assembly by passing the portion of the electrical energy stored in the remote module to the squib in response to the remote module receiving the firing signal; and igniting the pyrotechnic material using the heat generated by the squib to release a gas to inflate an airbag in the airbag assembly.

* * * * *